June 17, 1930.　　　　G. W. EMRICK　　　　1,764,289
SPINDLE FOR CHUCK DEVICES
Filed Sept. 18, 1928
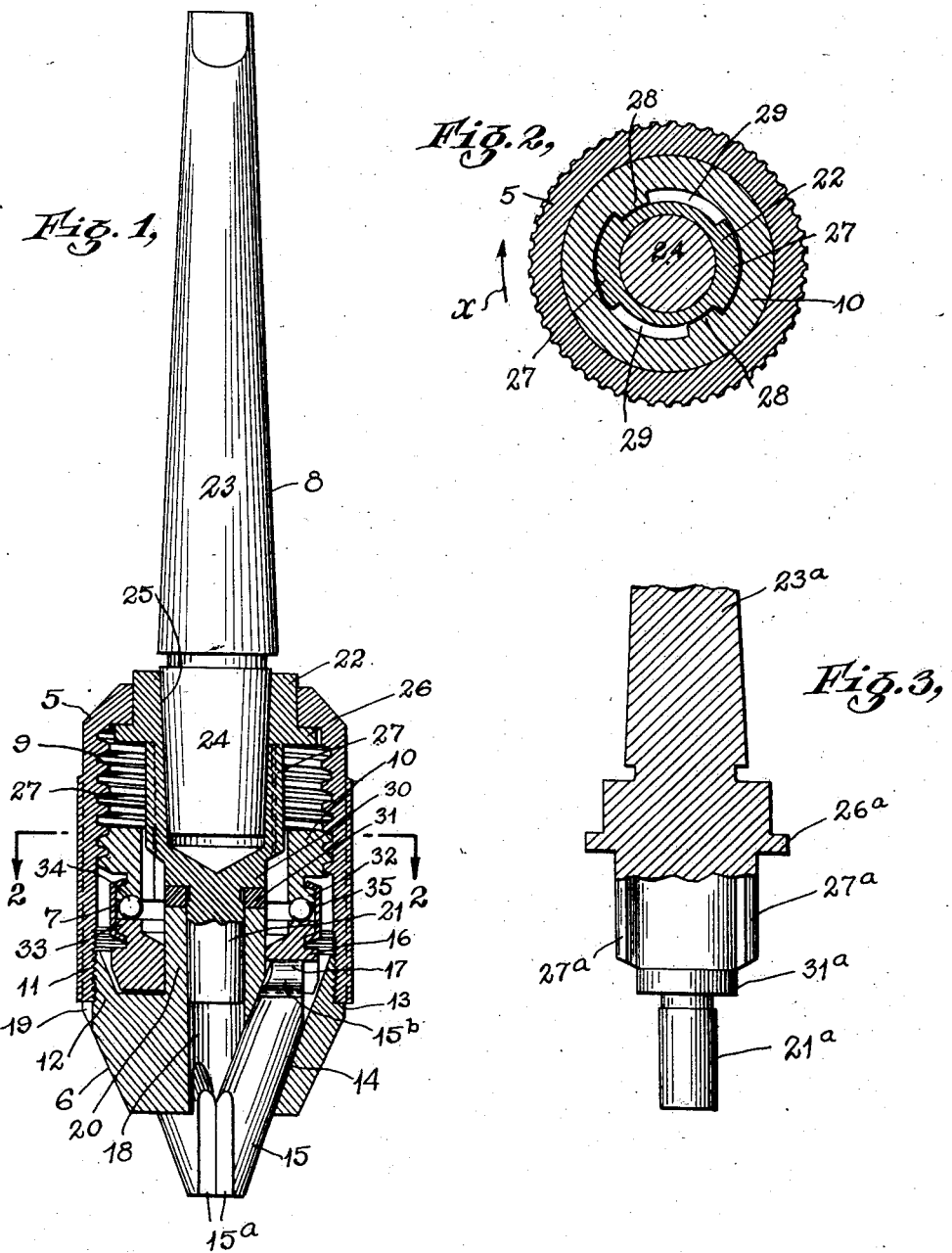

Patented June 17, 1930

1,764,289

UNITED STATES PATENT OFFICE

GEORGE W. EMRICK, OF BROOKLYN, NEW YORK, ASSIGNOR, BY MESNE ASSIGNMENTS, TO ETTCO TOOL CO. INC., OF BROOKLYN, NEW YORK, A CORPORATION OF NEW YORK

SPINDLE FOR CHUCK DEVICES

Application filed September 18, 1928. Serial No. 306,753.

This invention relates to chuck devices and particularly to the spindles employed in conjunction with such devices; and the object of the invention is to provide a spindle member having a clutch portion cooperating with a jaw actuating part of the device in such manner as to permit relative movement of said part with respect to the spindle or spindle member to insure the quick release of the jaws from a tool supported in the chuck device; a further object being to provide a spindle or spindle member of the class specified which may be built into and constitute a unit part of a chuck device or may be manufactured and sold separately in the manner of the manufacture and sale of other spindles of this class; and with these and other objects in view, the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional view of a chuck device showing one of my improved spindles mounted in connection therewith.

Fig. 2 is a section on the line 2—2 of Fig. 1; and,

Fig. 3 is a side and sectional view of a modified form of spindle which I employ.

For the purpose of illustrating one use of my invention I have shown in the accompanying drawing the structure of a chuck device forming the subject matter of a companion application filed of equal date herewith. This chuck device consists of a casing consisting of a tubular part 5 and a substantially conical part 6 forming one unit of the device. Another unit is represented at 7 and will be termed the jaw supporting and operating unit, and at 8 I have shown my improved spindle unit which may consist of separate parts as seen in Figs. 1 and 2, or be of unitary construction as seen in Fig. 3.

The casing 5 has an internal screw thread 9 at its upper end to receive a correspondingly externally threaded collar 10, which is part of the unit 7. The parts 5 and 6 are each threaded as seen at 11 and 12 respectively, to permit of assemblage; the part 6 having a shoulder 13 which seats upon the lower end of the part 5.

The part 6 has a plurality of angularly arranged bores 14 in which the jaws 15 of the unit 5 are slidably mounted, permitting the movement of the jaw faces 15$^a$ inwardly and outwardly as well as longitudinally with respect to the axis of the chuck body in the operation of engaging a tool. The unit 7 includes a jaw mounting ring 16 and is provided with radially and substantially circular bores 17 to receive knobs 15$^b$ on the jaws 15 for keying the jaws to said ring, and permitting the radial movement thereof as in the structure shown in the companion application.

The part 6 of the casing has a central bore 18, in which the shank of a drill or other tool is adapted to be placed. To facilitate the attachment and detachment of the parts 5 and 6, the periphery of the part 6 is provided with one or more notches 19 to receive a spanner or other wrench. The part 6 also includes an upwardly and inwardly extending sleeve portion 20 which forms an axis for the unit 7 and also a bearing for a trunnion 21 arranged at the lower end of a conductor or spindle member 22.

As seen in Figs. 1 and 2 of the drawing, my improved spindle consists of a spindle proper 23 which is of conventional construction and includes a tapered end portion 24 which seats within a tapered bore 25 provided in the upper end of the member 22. While this is a preferred method of coupling the parts together, it will be understood that any suitable means may be employed, for example, the spindle 23 may have a drive fit in or threaded engagement with the member 22. The member 22 includes a retaining flange 26 which cooperates with the upper wall of the part 5 of the casing to prevent upward or outward movement of said member. Arranged on the shank portion of the member 22 below the flange 26 and above the trunnion 21 are two oppositely disposed and radially projecting clutch elements 27 which are adapted to cooperate with other oppositely disposed and inwardly directed clutch elements 28 arranged in the bore of the collar 10. The circumferential dimensions of the elements 27 and 28 collectively are such as to leave comparatively large circumferential clearances 29 between adjacent faces of said elements as clearly seen in Fig. 2 of the drawing, thus permitting a free and independent rotary movement of the collar 10 with respect to the member 22. As will be seen on a consideration of Fig. 1, the collar 10 is also capable of longitudinal movement with respect to the axis of the member 22.

Between the elements 27 and spindle 21, the member 22 has a bearing shoulder 30 between which and the upper end of the sleeve 20 is arranged a washer 31. As previously stated, the collar 10 and ring 16 constitute part of the jaw operating unit and said collar is provided at its lower end with an angular flange 32, and the ring 16 at its upper end with a corresponding flange 33, the adjacent faces of the collar and ring having annular grooves for receiving a plurality of bearing balls 34 which space said parts and permit the rotation of the collar 10 with respect to the ring 16. An annular coupling ring 35 is employed to couple the collar 10 and ring 16 together by turning the side edges of the ring inwardly and around the flanges 32 and 33 as clearly seen in Fig. 1 of the drawing.

With the construction shown in Fig. 1, my improved spindle comprises the spindle member 22 and the spindle proper 23 which may be detached from the member 22 or said parts may be manufactured and sold separately or collectively. However, these two parts may be made in one unit as seen in Fig. 3 of the drawing, wherein 23$^a$ represents the shank portion of the spindle, 21$^a$ the trunnion, 26$^a$ the retaining flange and 27$^a$ the two clutch elements, the bearing shoulder being shown at 31$^a$. All of these parts are similar in all respects to the parts 21, 23, 26, 27 and 31 as shown in Figs. 1 and 2 of the drawing.

While the structure shown in Fig. 3 may be preferred in some respects, on the other hand it is more likely that the structure seen in Fig. 1 of the drawing will be preferred in that a conventional type of spindle 23 may be employed, and all that is necessary is to manufacture the member 22 which constitutes a spindle member or adaptor, this arrangement effecting a saving in manufacturing costs, especially when it is borne in mind that the parts 27$^a$ and 21$^a$ should be made of a comparatively hard and strong and durable metal.

In the operation of the chuck device, it will be understood that by rotating the casing or chuck body, the unit 7 is raised or lowered to move the paws 15 outwardly and inwardly with respect to the bore 18 or a tool supported therein. The collar 10 is held against rotation on the spindle by virtue of the clutch elements 27 and 28.

In addition to providing direct coupling of the spindle or member 22 with the collar 10 of the unit 7, which constitutes one feature of my invention, another feature resides in the independent rotary movement of the collar 10 with respect to the spindle to permit the quick releasing of the jaws 15 especially when they have been firmly moved into engagement with a tool, under great stress or strain to which the tool has been subjected, and to accomplish this result by what I term a hammer blow.

For example, let us assume that the members 27 are in engagement with the members 28 as seen in Fig. 2 of the drawing during the driving or drilling operation of the chuck, and it is desired to disengage the tool by releasing the jaws 15. If the casing 5 is struck by the palm of a hand in a tangential fashion and in the direction of the arrow $x$, Fig. 2, the casing carrying the ring 10 with it will advance in this direction until such time as the elements 28 strike the other elements 27 than those previously engaged thereby, suddenly stopping the progress of the ring 10, thus the velocity of the casing 5 will cause the ring 10 to be freed therefrom and permitted to move longitudinally thereof on the screw threads 9, moving the jaws 15 upwardly and thus releasing the tool. This result will take place even though the spindle 23 is not firmly held against rotation, the weight of the elements or mechanisms of the spindle being sufficient to accomplish the releasing of the ring 10.

My improved spindle construction and chuck device is adapted primarily for use in connection with what are known as electric drills but may be employed in connection with drilling machines, devices or apparatus of any kind or class. It is most important in connection with the former use however in that the spindles are usually coupled with or constitute a part of the rotary field of an electric motor and have no means other than their weight for resisting the rotary force or movement required to release the tool. Thus the hammer blow clutch construction of the spindle accomplishes the desired operation in a simple and effective manner.

It will be understood that while I have shown my improved spindle construction as used in conjunction with a chuck device of specific structure that my invention is not necessarily limited to this use nor to the specific arrangement of clutch elements herein shown and described, and various other changes in and modifications of the construction herein set out may be made within the scope of the appended claim without departing from the spirit of my invention or sacrificing its advantages.

Having fully described my invention, what I claim as new and desire to secure by Letters Patent, is:—

The combination with a chuck comprising a casing and a collar arranged in and in screw threaded engagement with said casing and movable longitudinally thereof, of a spindle member rotatably mounted in the casing, a comparatively long clutch portion on said member within the casing, said clutch portion having outwardly and radially projecting integral clutch elements extending throughout substantially the full length of said clutch portion and adapted to cooperate with corresponding clutch elements on said collar, in the several positions of the collar in said casing.

In testimony that I claim the foregoing as my invention I have signed my name this 14th day of Sept., 1928.

GEORGE W. EMRICK.